March 16, 1926. 1,576,505
J. E. CLOUGH
TRUNKING SADDLE
Filed April 12, 1923
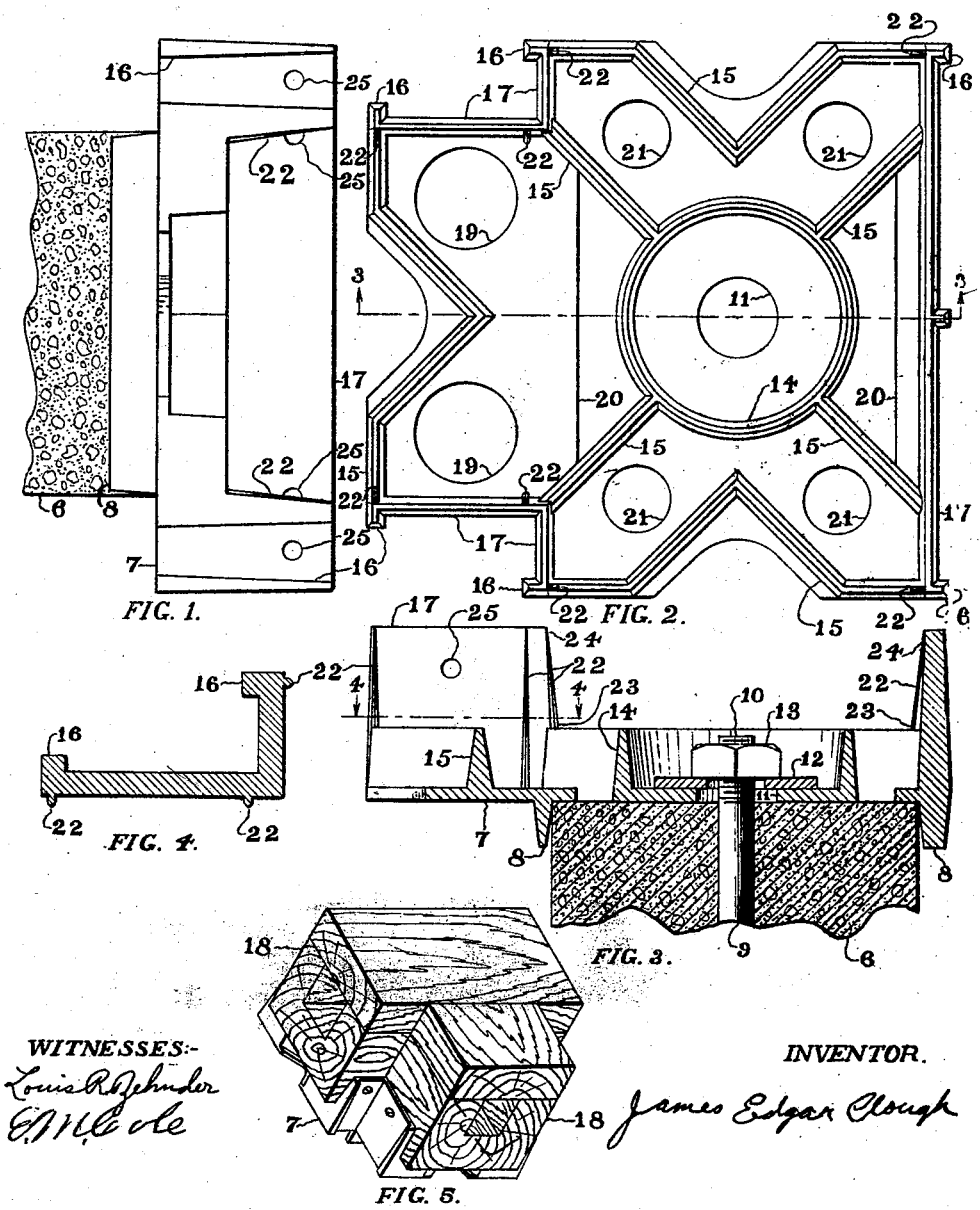
WITNESSES:-
INVENTOR.
James Edgar Clough Patented Mar. 16, 1926.

1,576,505

UNITED STATES PATENT OFFICE.

JAMES EDGAR CLOUGH, OF LA GRANGE, KENTUCKY.

TRUNKING SADDLE.

Application filed April 12, 1923. Serial No. 631,651.

*To all whom it may concern:*

Be it known that I, JAMES EDGAR CLOUGH, a citizen of the United States, residing at La Grange, in the county of Oldham and State of Kentucky, have invented a new and useful Trunking Saddle, of which the following is a specification.

My invention relates to means for securing trunking (wood conduit such as is used extensively in railroad signaling) to wood or concrete supports.

The invention consists essentially, in the combination with trunking, of fittings of a design to securely and permanently fasten said trunking to its supports.

An object of this invention is to produce a fitting of this character of maximum strength and durability which will not hold water.

A further object is to provide a device as characterized which will firmly hold trunking of varying widths.

A further object is to provide a device as characterized which will eliminate the necessity of mitered joints in trunking at intersections.

A further object is to provide a device as characterized which shall be economical in construction, easily installed and permanent.

With the foregoing and other objects in view, the invention consists of the novel design illustrated in the accompanying drawing, which forms a part of this specification, wherein is set forth an embodiment of the invention.

Because of the many shapes that will be required in practice I have found it impractical to show them all in the drawings and for this reason I have shown only the one known as a T, which is typical, but it is to be understood that such shapes may be resorted to as come within the scope of the appended claims.

In the drawings, wherein similar reference characters designate like parts in the several views—

Figure 1 is a side elevation of the trunking saddle in place on a concrete support, the trunking being removed so as to show the details; Fig. 2, a plan view of the trunking saddle only; Fig. 3, is a section on line 3—3 of Fig. 2 and in addition shows method of securing trunking saddle to support; Fig. 4 is a section (on an enlarged scale) on line 4—4 of Fig. 3; Fig. 5 is an isometric view (on a reduced scale) of trunking saddle with trunking in place showing simplicity of joint and method of securing trunking to saddle.

Referring now to the drawing wherein is shown a portion of the support 6, upon which is secured trunking saddle 7, having two vertical flanges 8, on the under side forming a channel for the reception of support 6, and preventing said trunking saddle from turning thereon. If the support 6, is made of concrete an anchor bolt 9, is cast therein, parallel to the sides of said support and at right angles to the base of trunking saddle 7, the end 10, of said anchor bolt extending beyond the upper extremity of said support and is threaded.

End 10 passes through hole 11, in the trunking saddle and washer 12, nut 13, is placed upon end 10, of anchor bolt 9 and tightened with a wrench, thus securely fastening trunking saddle 7, to its support 6. Trunking saddle 7, may be secured to a metallic support (not shown) by means of an ordinary machine bolt or it may be fastened to a wood support, in a manner similar to the method used with a concrete support, simply by substituting an ordinary lag screw for anchor bolt 9, and nut 13.

Circular rib 14 and straight ribs 15, are so arranged to give sufficient strength and are high enough to provide space for bolt end 10, washer 12, and nut 13.

Vertical ribs 16, are placed so as to greatly increase the strength of upper vertical flanges 17, which form a channel in which the trunking 18, is placed.

Holes 19, 20 and 21, are for draining the cavities formed by ribs 14, and 15, and thus preventing water from accumulating therein and rotting the trunking.

Trunking frequently runs undersize but the channel formed by the vertical flanges 17, must necessarily be made wide enough to take full size material, therefore if nothing were to prevent it a piece of undersize trunking would fit loose in the channel and would be subject to considerable vibration, which is injurious; an important feature of my invention is to overcome this vibration by placing so called knife edges 22, on the inside of vertical flanges 17, as shown in the drawings. These knife edges 22, taper from about one eigthth of one inch (1/8") at the bottom 23, to nothing at the top 24; now if a narrow piece of trunking is placed in the trunking saddle it will just fit at the bottom and if a slightly larger or full size piece of trunking is placed therein all that is necessary to make it go into place is a slight downward blow with a hammer or other suitable object, thus causing the knife edge 22, to cut into the trunking and permit it to take its proper place. The cross section Fig. 4, clearly shows the shape of the said knife edges.

Having placed the trunking in the saddle all that remains to be done is to secure said trunking to said saddle, by driving wood screws, nails or other suitable means through the holes 25, as shown in Fig. 5. Holes 25, are low enough so that nails, screws or other means driven through them will not enter the wire channel of the trunking.

Having thus described my invention so that anyone skilled in the art pertaining thereto can make and use same, I claim:—

1. A trunking saddle comprising a base; a plurality of parallel vertical flanges secured thereto, forming channels above and below said base; said parallel vertical flanges secured to and forming channels above said base, having a plurality of horizontal holes therein, said base having a vertical hole centrally located therein and a plurality of vertical ribs, positioned about said vertical hole, secured thereon in said upper channel; means for securing said trunking saddle to a support.

2. A trunking saddle comprising a base; a plurality of parallel vertical flanges secured thereto, forming channels above and below said base; said parallel vertical flanges having a plurality of vertical ribs secured thereon, outside relative to said channels; said parallel vertical flanges secured to and forming channels above said base, having a plurality of horizontal holes therein; said base, having a vertical hole centrally located therein and a plurality of vertical ribs, positioned about said vertical hole, secured thereon in said upper channel, means for securing said trunking saddle to a support.

3. A trunking saddle comprising a base; a plurality of parallel vertical flanges secured thereto, forming channels above and below said base; said parallel vertical flanges having a plurality of knife edges secured thereto, inside relative to said upper channel; said knife edges diagonally positioned so that the distance between opposite knife edges is substantially less than the width of said upper channel near said base but substantially the same as the width of said upper channel near the upper edges of said parallel vertical flanges of said upper channel; said parallel vertical flanges, secured to and forming channels above said base, having a plurality of horizontal holes therein; said base having a vertical hole centrally located therein and a plurality of vertical ribs, positioned about said vertical hole, secured thereon in said upper channel; means for securing said trunking saddle to a support.

4. A trunking saddle comprising a base; a plurality of parallel vertical flanges secured thereto, forming channels above and below said base; said parallel vertical flanges having a plurality of vertical ribs secured thereon, outside relative to said channel; said parallel vertical flanges having a plurality of knife edges secured thereto, inside relative to said upper channel; said knife edges diagonally positioned so that the distance between opposite knife edges is substantially less than the width of said upper channel near said base but substantially the same as the width of said upper channel near the upper edge of said parallel vertical flanges of said upper channel; said parallel vertical flanges secured to and forming channels above said base, having a plurality of horizontal holes therein; said base having a vertical hole centrally located therein and a plurality of vertical ribs, positioned about said vertical hole, secured thereon in said upper channel; means for securing said trunking saddle to a support.

5. A trunking saddle comprising a base; a plurality of parallel vertical flanges secured thereto, forming channels above and below said base; said parallel vertical flanges secured to and forming channels above said base, having a plurality of horizontal holes therein; said base having a vertical hole centrally located therein and a plurality of vertical ribs positioned about said vertical hole, secured thereon in said upper channel; said base having a plurality of vertical holes therein and means for securing said trunking saddle to a support.

6. A trunking saddle comprising a base; a plurality of parallel vertical flanges secured thereto, forming channels above and below said base; said parallel vertical flanges having a plurality of vertical ribs secured thereon, outside relative to said channel; said parallel vertical flanges having a plurality of knife edges secured thereto, inside relative to said upper channel; said knife edges diagonally positioned so that the distance between opposite knife edges is substantially less than the width of said upper channel near said base but substantially the same as the width of said upper channel near the upper edge of said parallel vertical flanges of said upper channel; said parallel vertical flanges secured to and forming channels above said base, having a plurality of horizontal holes therein; said base having a vertical hole centrally located therein and a plurality of vertical ribs positioned about said vertical hole, secured thereon in said upper channel said base having a plurality of vertical holes therein; means for securing said trunking saddle to a support.

JAMES EDGAR CLOUGH.